United States Patent [19]

Kasuga

[11] Patent Number: 5,721,930
[45] Date of Patent: Feb. 24, 1998

[54] ELECTRONIC APPARATUS WITH COMPONENT OPERATING STATE CONTROL

[75] Inventor: Nobuyuki Kasuga, Kawasaki, Japan

[73] Assignee: Canon Kabushiki Kaisha, Tokyo, Japan

[21] Appl. No.: 408,471

[22] Filed: Mar. 21, 1995

Related U.S. Application Data

[63] Continuation of Ser. No. 909,745, Jul. 7, 1992, abandoned.

[30] Foreign Application Priority Data

| Jul. 16, 1991 | [JP] | Japan | 3-175158 |
| Jul. 16, 1991 | [JP] | Japan | 3-175163 |
| Jul. 16, 1991 | [JP] | Japan | 3-175165 |
| Jul. 16, 1991 | [JP] | Japan | 3-175166 |

[51] Int. Cl.$^6$ .................................................. G06F 1/30
[52] U.S. Cl. ............................. 395/750; 395/182.22
[58] Field of Search ............................... 395/575, 750, 395/182.22; 364/707; 371/66

[56] References Cited

U.S. PATENT DOCUMENTS

| 4,763,333 | 8/1988 | Byrd | 371/66 |
| 4,868,832 | 9/1989 | Marrington et al. | 395/750 X |
| 4,907,150 | 3/1990 | Arroyo et al. | 395/575 |
| 4,979,143 | 12/1990 | Takano et al. | 395/575 |
| 5,151,992 | 9/1992 | Nagae | 395/750 |
| 5,163,153 | 11/1992 | Cole et al. | 395/750 |
| 5,167,024 | 11/1992 | Smith et al. | 395/375 |
| 5,235,532 | 8/1993 | Sugino | 364/707 |
| 5,276,890 | 1/1994 | Arai | 395/750 |
| 5,303,171 | 4/1994 | Belt et al. | 364/707 |
| 5,339,446 | 8/1994 | Yamasaki et al. | 395/750 |
| 5,341,493 | 8/1994 | Yanai et al. | 395/750 X |
| 5,355,490 | 10/1994 | Kou | 395/750 |
| 5,530,877 | 6/1996 | Hanaoka | 395/750 |
| 5,539,876 | 7/1996 | Saito et al. | 395/182.12 |
| 5,560,024 | 9/1996 | Harper et al. | 395/750 |

FOREIGN PATENT DOCUMENTS

0429781  6/1991  European Pat. Off.

OTHER PUBLICATIONS

Hippert et al., "Saving Random–Access Memory in the Event of a Power Failure", IBM Technical Bulletin, col. 17, No. 5 (Oct. 1974), pp. 1449–1450.

"Designing a Laptop Computer with Power Management Features", Electronic Engineering, Jul. 1190, pp. 43–46.

IBM Technical Disclosure Bulletin, vol. 34, No. 4A, Sep. 1991, pp. 22–23, "Memory Parity Check on Resume".

IBM Technical Disclosure Bulletin, vol. 33, No. 10A, Mar. 1991, pp. 440–442, "Battery Fail–Safe Mechanism for Personal Computer".

*Primary Examiner*—Glenn A. Auve
*Attorney, Agent, or Firm*—Fitzpatrick, Cella, Harper & Scinto

[57] ABSTRACT

There is disclosed an electronic apparatus in which in the case where a resume is instructed from the user, a status of FDD is checked, and when the FDD is in the state in which it can be shifted to the resume, the resume is executed, and when it is impossible to shift to the resume, an alarm is generated to the user so as not to shift to the resume. The shift to the resume status is detected every stage and a record is stored into a memory every completion of each stage. When each stage is completed, it is regarded that the information stored at this stage can be broken, so that the power supply to a device is stopped. In case of executing a resuming operation, information is written back for only the device which needs the resuming operation in accordance with the recorded content. Thus, even when the resume is in an incomplete state, the apparatus can be again resumed to the former operating status.

12 Claims, 10 Drawing Sheets

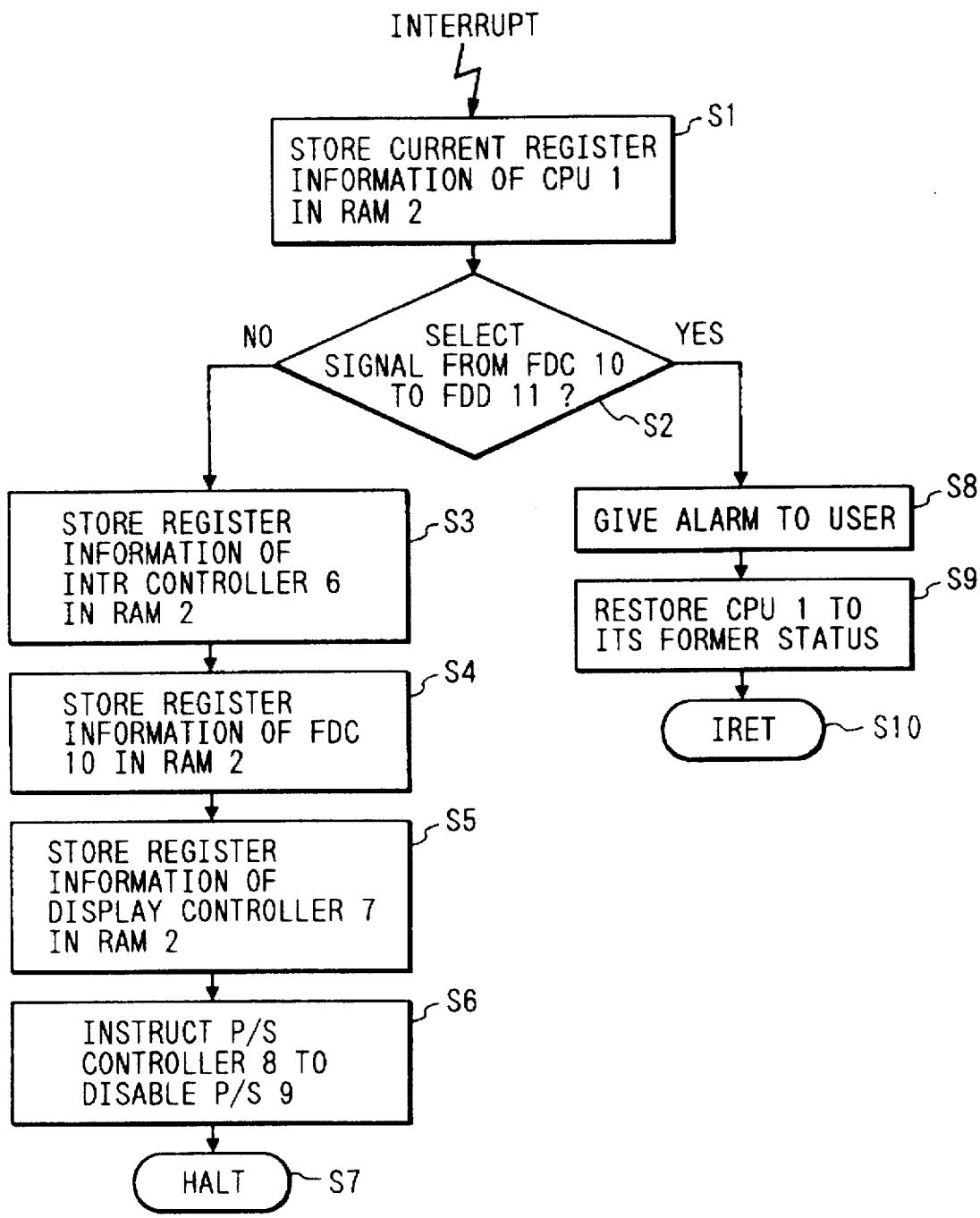

ELECTRONIC APPARATUS WITH COMPONENT OPERATING STATE CONTROL

This application is a continuation of application Ser. No. 07/909,745, filed Jul. 7, 1992, now abandoned.

BACKGROUND OF THE INVENTION

1. Field of the Invention

The invention relates to an electronic apparatus for executing a resume to store the memory content regarding the operating status of an electronic circuit so as not to be extinguished on the basis of various statuses such as operating status of a non-volatile external memory device, control status of a power supply to each device, opening/closing status of a cover member for a main body of an apparatus, status of a residual amount of a battery provided in the apparatus, and the like.

2. Related Background Art

Hitherto, an electronic apparatus such as a computer apparatus or the like has what is called a resume function such that various operation information of the computer just before a power supply is turned off are stored into a memory or the like and, when the power supply is again turned on, the former status can be resumed.

In the above conventional apparatus, however, there is the first drawback such that even in the case where the interruption is not permitted during the operation because a target device is operating such as a state in which an FDD (abbreviation of a floppy disk drive) is being accessed or the like, if the user erroneously instructs the interruption, the interruption can be performed, so that in the case where the user tries to resume such a status, the status cannot be resumed, and in a state such that the FDD is being accessed or the like, if the user erroneously interrupts the accessing operation, such a status cannot be resumed.

In the conventional apparatus, there is also the second drawback such that before a resume is perfectly completed, if the user tries to resume from the resume status by again depressing a switch or the like, a storing process of various statuses is interrupted during the operation, so that even if the user tries to resume from the incomplete resume status, there is a case where it is impossible to resume, and the storing process of various statuses is interrupted during the operation by a switching operation of a switch before the resume is perfectly completed, and it is impossible to resume from the incomplete resume status.

In the conventional apparatus, there is the third drawback such that the status is shifted to the resume status only when the user clearly instructs the resume by depressing a switch or the like, so that the operations to interrupt/resume the use state become complicated, and accordingly, when the user forgets the switching operation to instruct the resume, the status is not shifted to the resume status.

There is the fourth drawback such that in an electronic apparatus to drive a device using an internal battery, for instance, in a computer apparatus or the like, hitherto, there is a case where if the user leaves the apparatus in a driving state, the built-in battery is consumed and all of the memory contents are finally lost, and in the case where the apparatus is left in a driving state for a long time by using the internal battery, the memory contents are extinguished in association with a reduction of the voltage of the built-in battery.

SUMMARY OF THE INVENTION

As for the above first drawback, it is the first object of the invention that during the accessing operation to a floppy disk as a non-volatile external memory device of a computer apparatus, by inhibiting the shift to a resume to store the current operating status of an electronic circuit into a memory, the occurrence of a trouble such that a resuming process cannot be performed in later or the like is prevented.

For this purpose, a construction of the first embodiment is used.

As for the second drawback, it is the second object of the invention that a resume to store the current operating status of an electronic circuit into a memory in case of turning off a power switch of a computer and to immediately resume the electronic circuit to the former status when the power switch is again turned on needs a slight time to store the status, so that when the resuming operation is instructed during the operation, the circuit cannot be returned to the foregoing status, and accordingly, by controlling the resume every stage, it is possible to resume from the incomplete resume status.

For this purpose, a construction of the second embodiment is used.

As for the third drawback, it is the third object of the invention that in case of interrupting the use of an electronic apparatus such as a portable computer or the like, the current operating status of an electronic circuit is stored into a memory by a simple operation such as to merely close a cover and when a switch is again turned on, the circuit is immediately resumed to the former status, thereby shifting to the resume status without making the user aware of such a shifting process.

For this purpose, a construction of the third embodiment is used.

As for the fourth drawback, it is the fourth object of the invention that there is a case where when an electronic apparatus such as a computer or the like with a construction that is driven by an internal battery is left for a long time in an operating state, the battery is consumed and the operation becomes impossible, and according to the invention, therefore, by monitoring a residual amount of the battery, a voltage drop of the battery is detected, and by writing resume information to store the status of the computer apparatus into a non-volatile recording medium (for example, disk device), it is prevented that data is unexpectedly broken due to the electric power consumption of the battery.

For this purpose, a construction of the fourth embodiment is used.

BRIEF DESCRIPTION OF THE DRAWINGS

FIG. 2 is a flowchart for a program to realize a resume function stored in an ROM 3 in FIG. 1;

DETAILED DESCRIPTION OF THE PREFERRED EMBODIMENTS

The first embodiment to solve the first drawback will be first explained.

Figure 1:
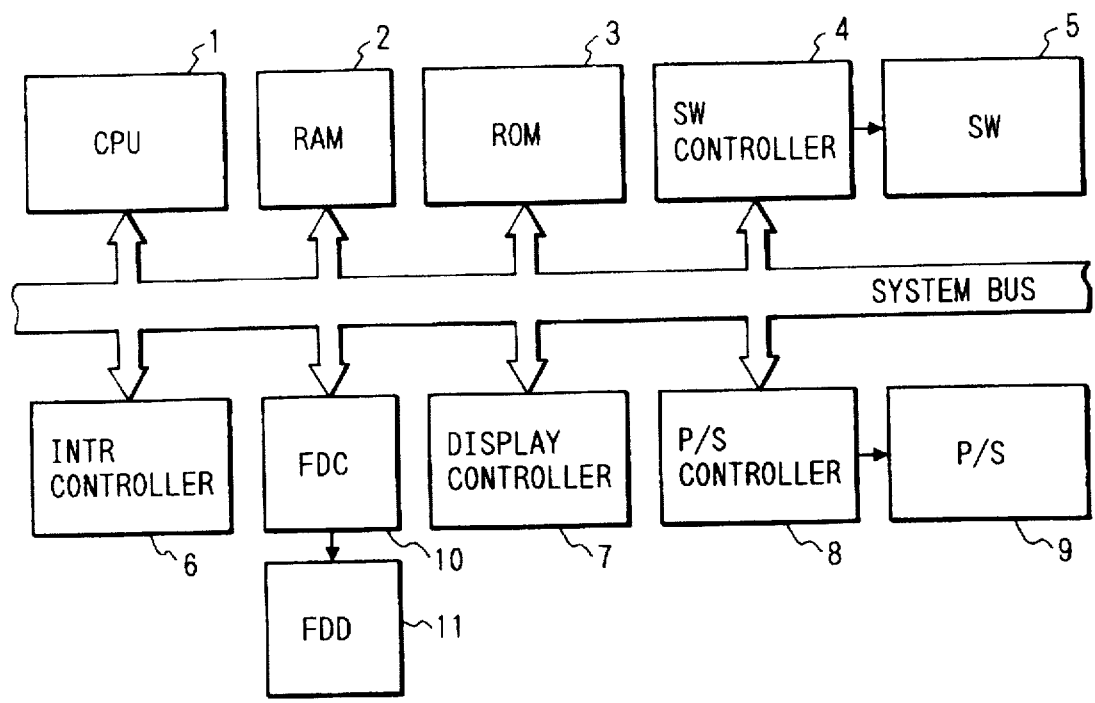
FIG. 1 is a system block diagram of a computer of the first embodiment of the invention.

FIG. 1 is a diagram showing most preferably a feature of the invention. In the diagram, reference numeral 1 denotes a CPU as a central processing unit as a main unit for control; 2 an RAM as a readable and writable memory to store various data; 3 an ROM as a read only memory in which a program that is necessary for the CPU 1 to operate has been stored; 4 a switch (SW) controller to generate an interruption request in accordance with a change in status of a switch (SW) 5; 5 the switch (SW); 6 an interrupt controller to generate an interruption to the CPU 1 in accordance with an interruption request from a device; 7 a display controller to form a control signal for a display; 8 a power supply controller to control the ON/OFF operation of a power supply (P/S) 9; 9 the power supply; 10 a floppy disk controller (hereinafter, abbreviated to FDC) to control the operation of a floppy disk drive (hereinafter, abbreviated to FDD) 11; and 11 the FDD.

FIG. 2 is a flowchart in the status storing mode of a program to realize a resume function stored in the ROM 3.

In the computer apparatus with the construction as mentioned above, when the user depresses the switch SW 5 to interrupt the use of the computer, the SW controller 4 sends the interruption request to the interrupt controller 6. Thus, the controller 6 generates a hardware interruption to the CPU 1. In response to the interruption command, the CPU 1 interrupts the current process and executes a resume processing program stored in the ROM 3.

As shown in FIG. 2, in step S1 in the program, current register information of the CPU 1 is first stored into the RAM 2. In step S2, a selection signal which is sent from the FDC 10 to the FDD 11 is checked in order to examine an operating status of the FDD 11. In this instance, when the selection signal is generated, it is determined that the FDD 11 has been driven. In step S8, an alarm indicating that the resume cannot be performed is generated to the user. The status of the CPU 1 is restored into the former status in step S9 and the processing routine is returned to the original process.

When no selection signal is generated, it is regarded that the FDD 11 is not driven, so that a status storing process is executed. The processing routine advances to steps S3 to S5. Information indicative of statuses of the interrupt controller 6 (in step S3), FDC 10 (in step S4), and display controller 7 (in step S5) are stored into the RAM 2, respectively. In step S6, the user instructs the P/S controller 8 to stop the power supply by turning off the power supply 9 and finishes the processing routine. In this instance, the P/S 9 disables only the power source of the device in which the content of the internal register has been stored in the above steps S3 to S5 and continues the current supply to the device such as an RAM or the like in which data has actually been stored. The actual power shut-off is executed with a slight delay time after the CPU 1 generates such an instruction. After the CPU 1 generates the instruction, the CPU 1 itself also enters a HALT status in step S7 and its power source is turned off.

According to the first embodiment as described above, in the case where the interruption is not permitted during the operation because the target device is operating as in a state in which the FDD is being accessed, by inhibiting the shift to the resume mode and by generating an alarm to the user, it is possible to prevent a case in which the status is unexpectedly broken.

The second embodiment to solve the second drawback will now be described.

Figure 3:
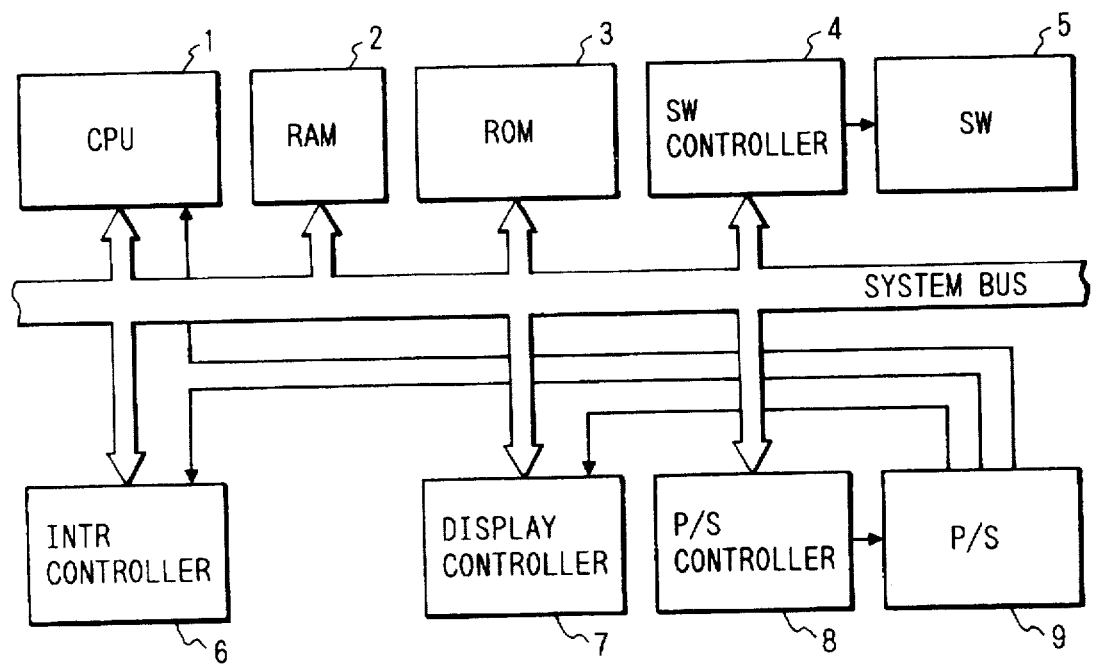
FIG. 3 is a system block diagram of a computer according to the second embodiment of the invention.

FIG. 3 is a diagram showing most preferably a feature of the invention. In the diagram, reference numeral 1 denotes the CPU (central processing unit) as a main unit for control; 2 the RAM as a readable and writable memory to store various data; 3 the ROM as a read only memory in which a program that is necessary for the CPU 1 to operate has been stored; 4 the SW controller to generate an interruption request in accordance with a change in status of the SW 5; 5 the SW (switch); 6 the interrupt controller to generate an interruption to the CPU 1 in accordance with the interruption request from the device; 7 the display controller to form a control signal to the display; 8 the P/S controller to control the ON/OFF operation of the power supply 9; and 9 the power supply.

Figure 4:
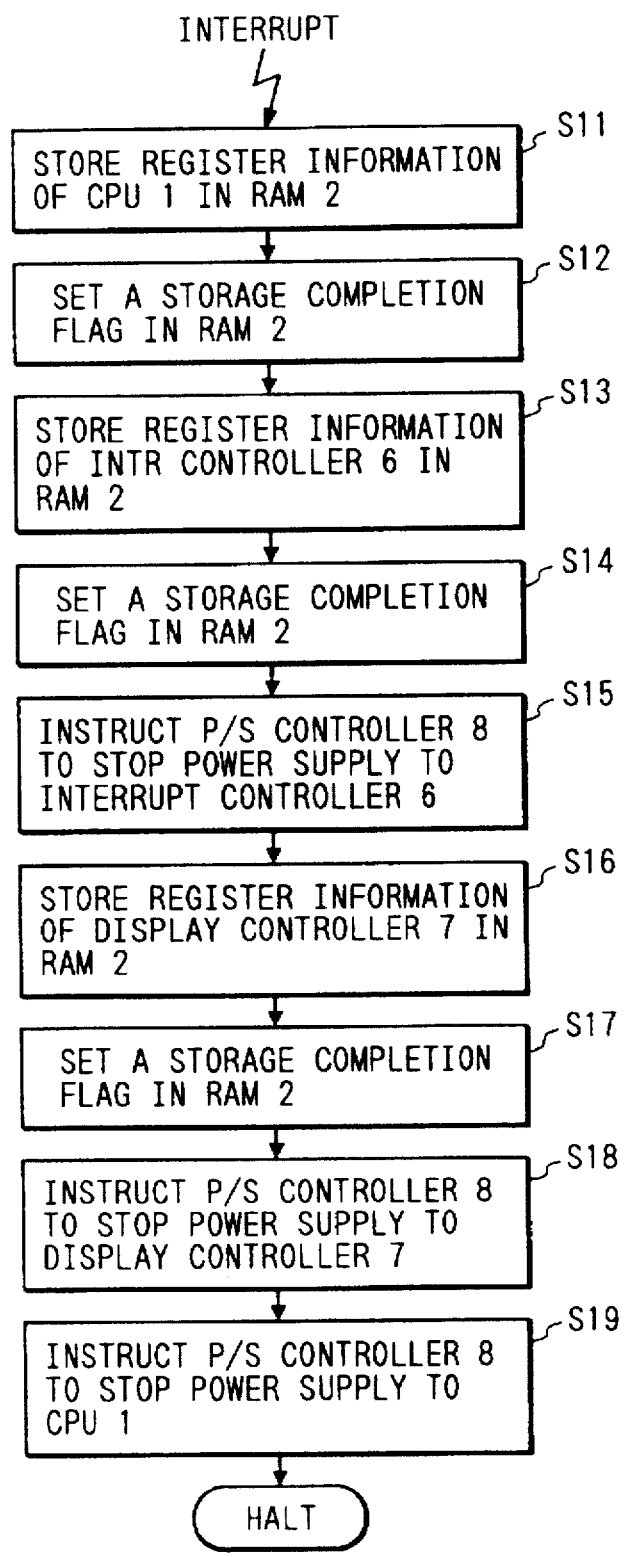
FIG. 4 is a flowchart for a processing program in a status storing mode to realize the resume function stored in an ROM in FIG. 3.

FIG. 4 is a flowchart for a program in the status storing mode to realize the resume function stored in the ROM 3. FIG. 3 is a flowchart for a program to realize a process in the status resuming mode.

In the computer apparatus with the construction as shown in FIG. 3, when the user depresses the switch SW 5 to interrupt the use of the computer, the SW controller 4 sends an interruption request to the interrupt controller 6. Thus, the interrupt controller 6 generates a hardware interruption to the CPU 1. In response to the interruption command, the CPU 1 interrupts the current process and executes the resume processing program stored in the ROM 3.

In the program, the register information of the CPU 1 is first stored in step S11 shown in FIG. 4. In step S12, the completion of the storage of the CPU 1 is recorded into the RAM 2. Similarly, the register information of the interrupt controller 6 is stored in step S13 and the completion of the storage is recorded into the RAM 2 in step S14. The power supply to the interrupt controller is stopped in step S15. The register information of the display controller 7 is recorded in step S16. The completion of the recording is recorded into the RAM 2 in step S17. The power supply is stopped in step S18. After completion of the resuming operations of the other devices, the power supply to the CPU 1 itself is stopped in step S19 and the apparatus is set into the perfect resume state.

Figure 5:
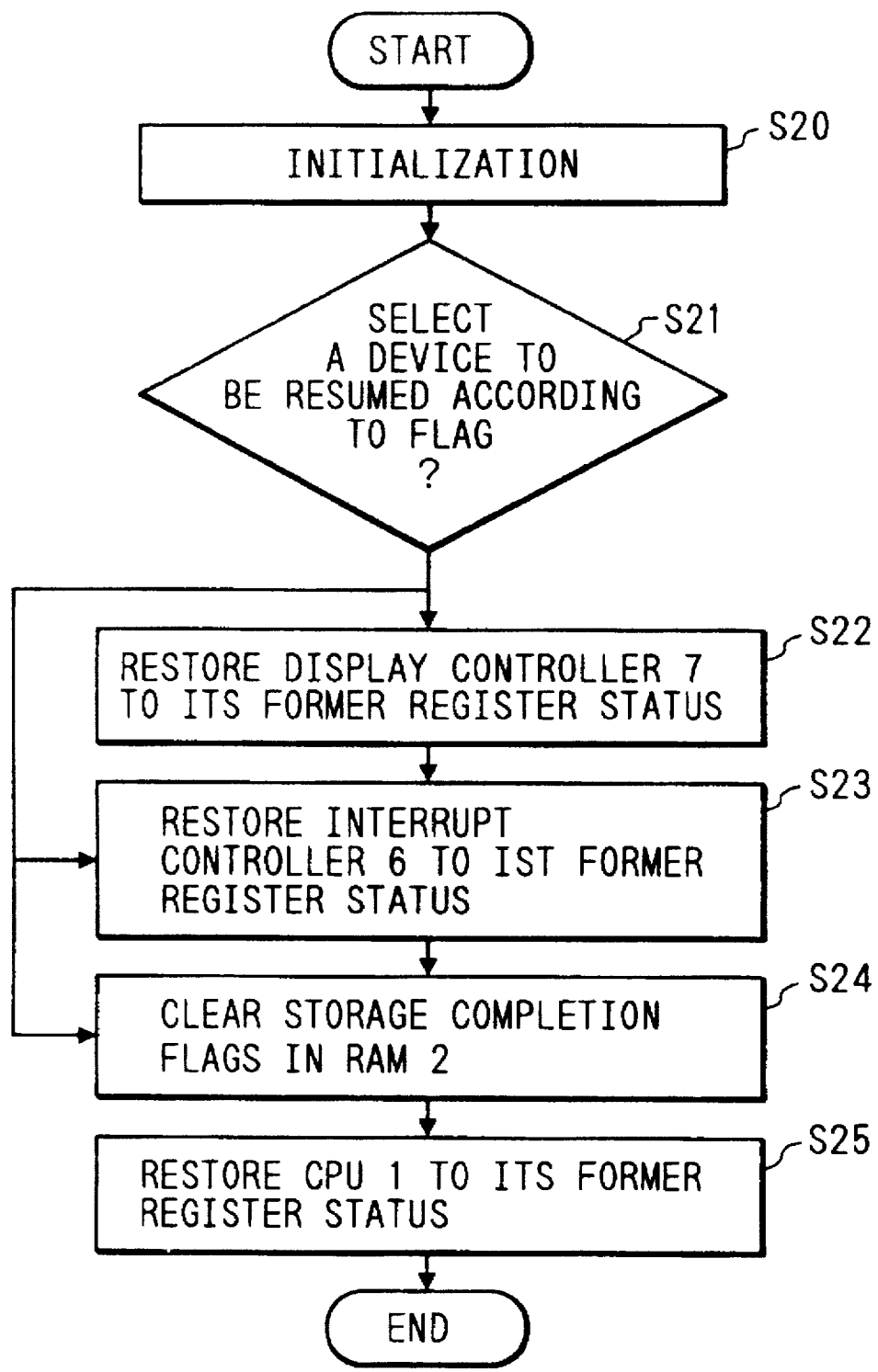
FIG. 5 is a flowchart for a processing program in the status resuming mode to realize the resume function stored in the ROM in FIG. 3.

To return from the resume, when the resume is instructed after the SW 5 shown in FIG. 3 was depressed, the power supply to all of the devices is restarted in step S20 in FIG. 5 and the apparatus is initialized. A check is now made in step S21 to see if it is necessary to execute the resuming process from which device with reference to resume completion information recorded in the RAM 2. For instance, if the resume has perfectly been completed, step S22 follows. In steps S22 to S25, the resuming process is executed with respect to each device in accordance with the data in the memory, the recording of the resume in the RAM 2 is erased, and the processing routine is set to a pointer position at a time point when the resume is instructed.

According to the embodiment 2 as mentioned above, by executing the resume every stage and by performing the power control to each device, the status can be again resumed even from the incomplete resume state.

The third embodiment to solve the foregoing third drawback will now be described.

Figure 6:
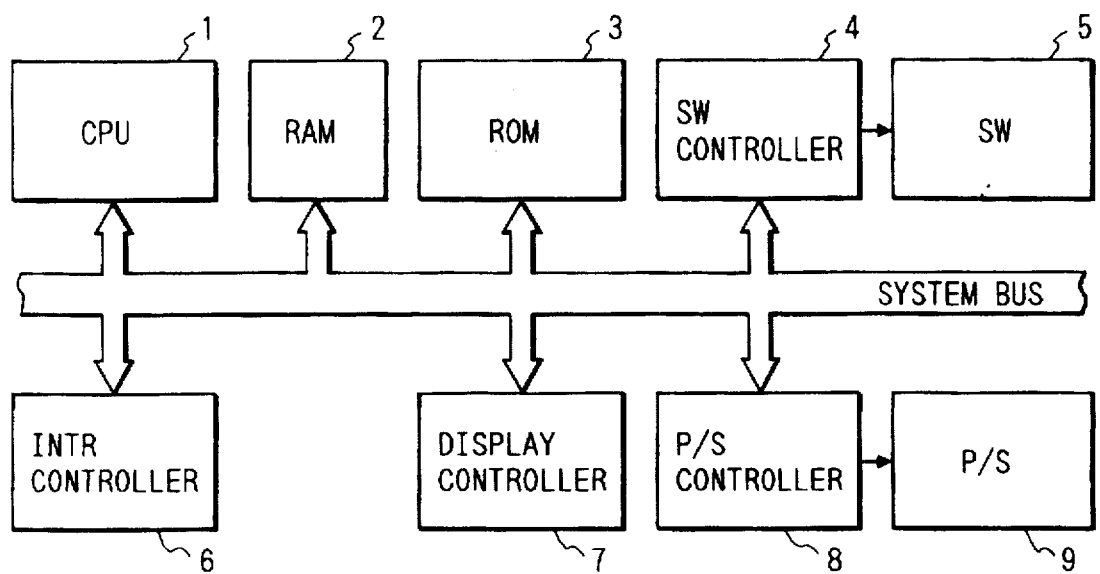
FIG. 6 is a system block diagram of a computer according to the third embodiment of the invention.

FIG. 6 is a diagram showing most preferably a feature of the invention. In the diagram, reference numeral 1 denotes the CPU (central processing unit) as a main unit for the control; 2 the RAM as a readable and writable memory to store various data; 3 the ROM as a read only memory in which a program that is necessary for the CPU 1 to operate has been stored; 4 the SW controller to generate an interruption request in accordance with a change in status of the SW 5; 5 the SW (switch); 6 the interrupt controller to generate an interruption to the CPU 1 in accordance with the interruption request from the device; 7 the display controller to form a control signal to the display; 8 the power supply controller to control the ON/OFF operation of the power supply 9; and 9 the power supply.

Figure 7:
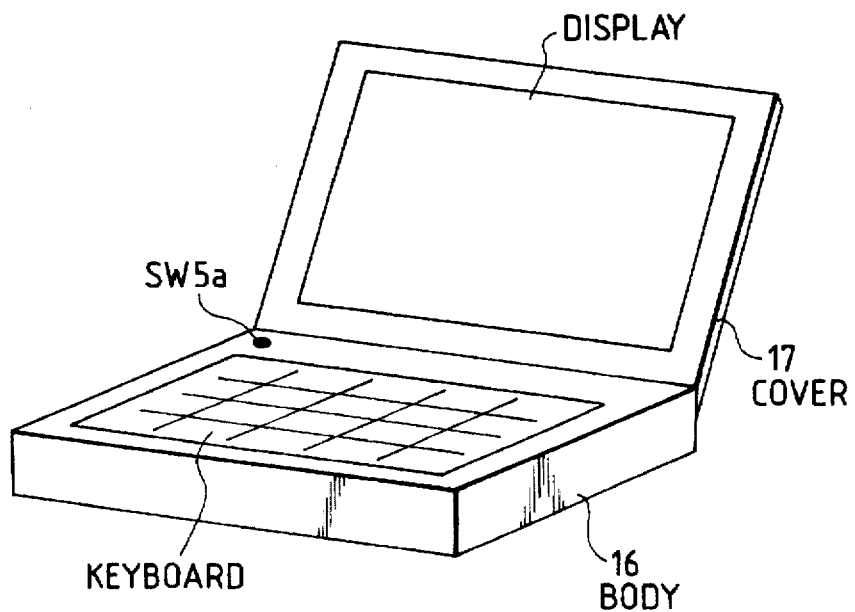
FIG. 7 is an external view of the portable computer of the third embodiment of the invention.

FIG. 7 is an external view of a portable computer embodying the invention. Reference numeral 16 denotes a main body including a main board, a keyboard, and the like and 17 indicates a cover commonly serving as a display and an enclosing cover.

Figure 8:
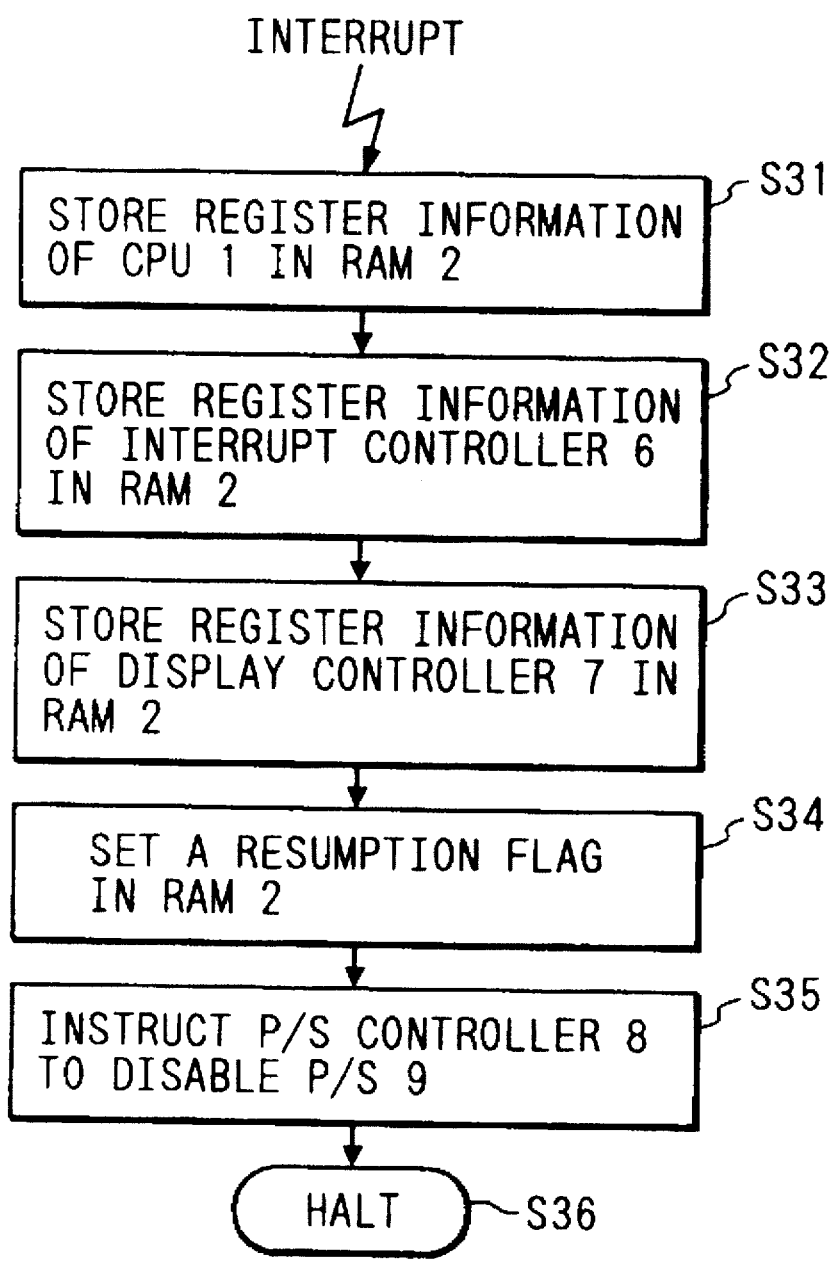
FIG. 8 is a flowchart for a processing program in the status storing mode to realize the resume function stored in a ROM in FIG. 6.

FIG. 8 is a flowchart for a program to realize the resume function stored in the ROM 3.

In the portable computer as shown in FIG. 7, it is now assumed that the user stopped the use of the computer and closed the cover 17. Thus, the cover 17 is depressed and a switch (SW) 5a is turned on. When the SW 5 in FIG. 6 is accordingly turned on, the SW controller 4 sends an interruption request to the interrupt controller 6. Thus, the controller 6 generates a hardware interruption to the CPU 1. In response to the interruption command, the CPU 1 interrupts the current process and executes the resume processing program stored in the ROM 3. In the above program, as shown in steps S31 to S33 in FIG. 8, internal register information of the CPU 1 (in step S31), the interrupt controller 6 (in step S32), and the display controller 7 (in step S33) are read out and stored into the RAM 2, respectively. In step S34, a flag is set into the RAM 2 so as to make it possible to discriminate that the system is in the resume status when the system is subsequently activated. In the next step S35, the user instructs the P/S controller 8 to turn off the power supply 9. In this instance, the power supply 9 shuts off the power supply to only the device in which the content of the internal register has been stored and continues the power supply to the device such as an RAM 2 or the like in which the data has actually been stored in the foregoing steps S31 to S33. The actual power shut-off is executed with a slight delay time after the CPU 1 generates the instruction. After the CPU 1 generates the instruction, the CPU 1 itself also enters the HALT state and its power supply is turned off.

Figure 9:
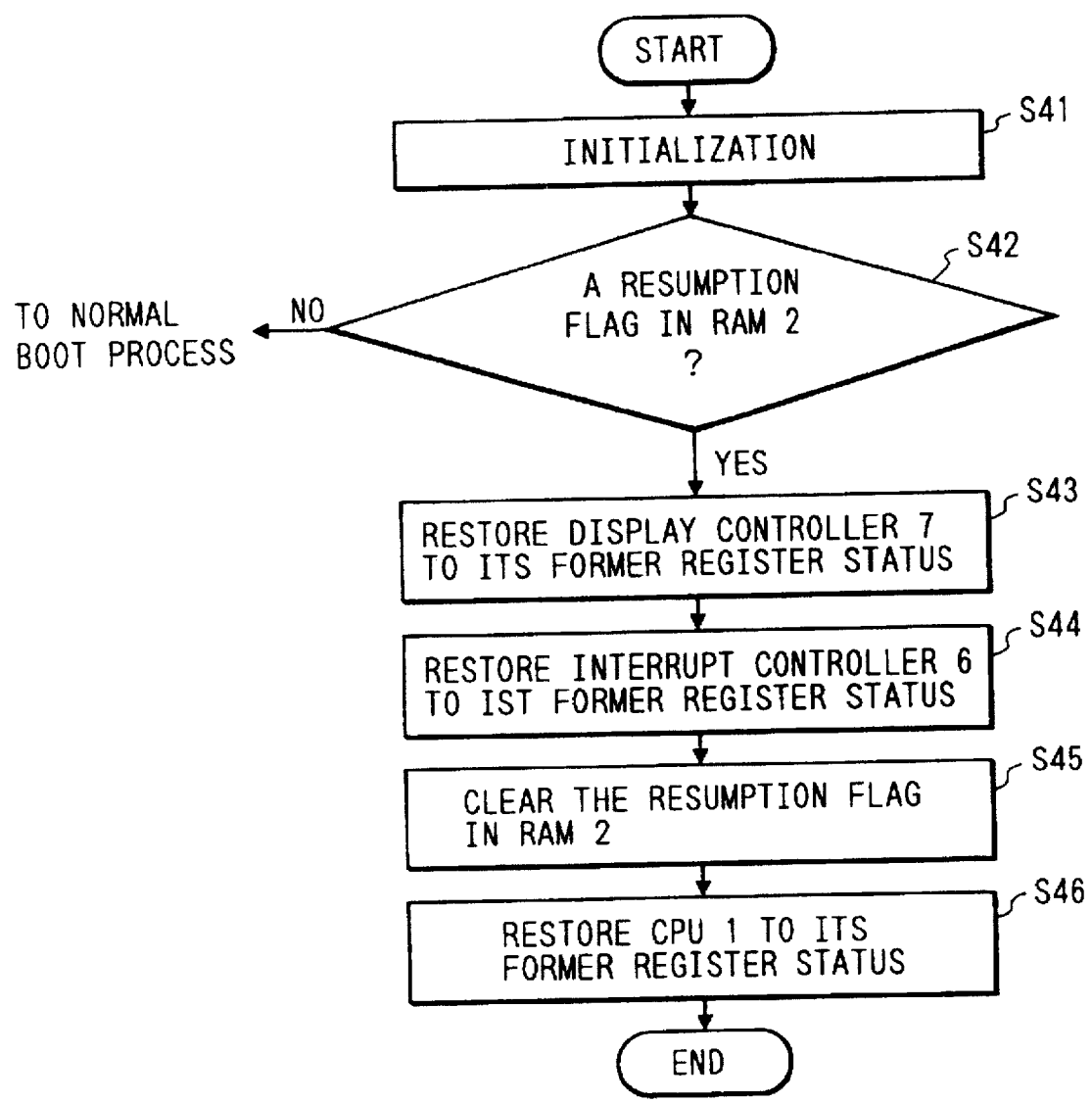
FIG. 9 is a flowchart for a processing program in the status resuming mode to realize the resume function stored in the ROM in FIG. 6.

FIG. 9 is a flowchart for a program to return from the resume state.

To return from the resume, as shown in FIG. 7, when the cover 17 is opened and the SW 5a is opened, the SW controller 4 in FIG. 6 instructs the P/S controller 8 so as to restart the power supply to all of the devices. Thus, the CPU 1 starts the operation and the main body is initialized in step S41 in FIG. 9. In step S42, a flag indicating that the main body is in the resume state is checked. If the flag has been set, a resume returning process is executed. The resume returning process is executed with respect to each device in accordance with the data in the memory in steps S43 to S46. The resume flag in the RAM 2 is erased and the processing routine is returned to the program which had been being executed at a time point when the resume has been instructed. When the main body is not in the resume state and the flag is not set in step S42, a normal boot process is executed. In place of the opening/closing operation of the cover 17, an attaching/detaching operation of the cover 17 to the main body 16 can be also used.

According to the third embodiment as mentioned above, since the system can be automatically shifted to the resume status by closing the cover upon interruption of the use, the system can be naturally shifted/resumed to the resume state without making the user aware of the resume function.

The fourth embodiment to solve the fourth drawback will now be described.

Figure 10:
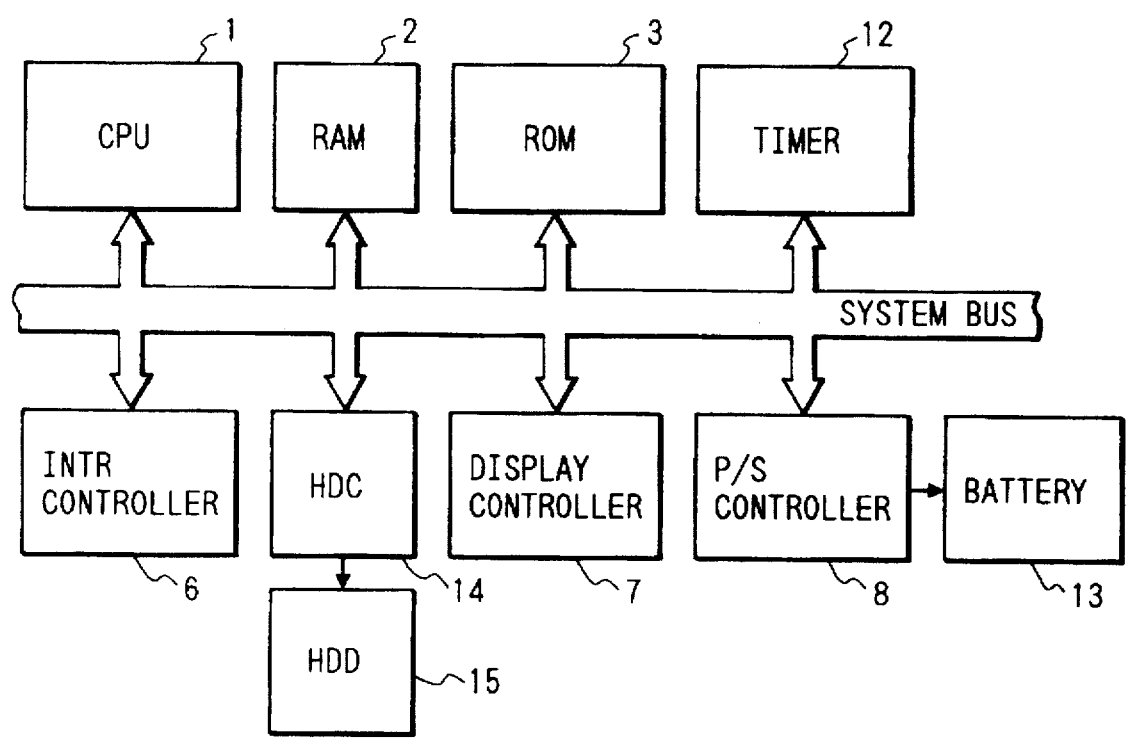
FIG. 10 is a system block diagram of a computer according to the fourth embodiment of the invention.

FIG. 10 is a diagram showing most preferably a feature of the invention. In the diagram, reference numeral 1 denotes the CPU (central processing unit) as a main unit of the control; 2 the RAM as a readable and writable memory to store various data; 3 the ROM as a read only memory in which a program that is necessary for the CPU 1 to operate has been stored; the interrupt controller to generate an interruption to the CPU 1 in accordance with an interruption request from the device; 7 the display controller to form a control signal to the display; 8 the power supply controller to control the ON/OFF operation of a battery 13; 12 a timer; 13 the battery; 14 a hard disk controller (hereinafter, abbreviated as HDC) to control the operation of a hard disk drive (hereinafter, abbreviated as HDD) 15; and 15 the HDD.

Figure 11:
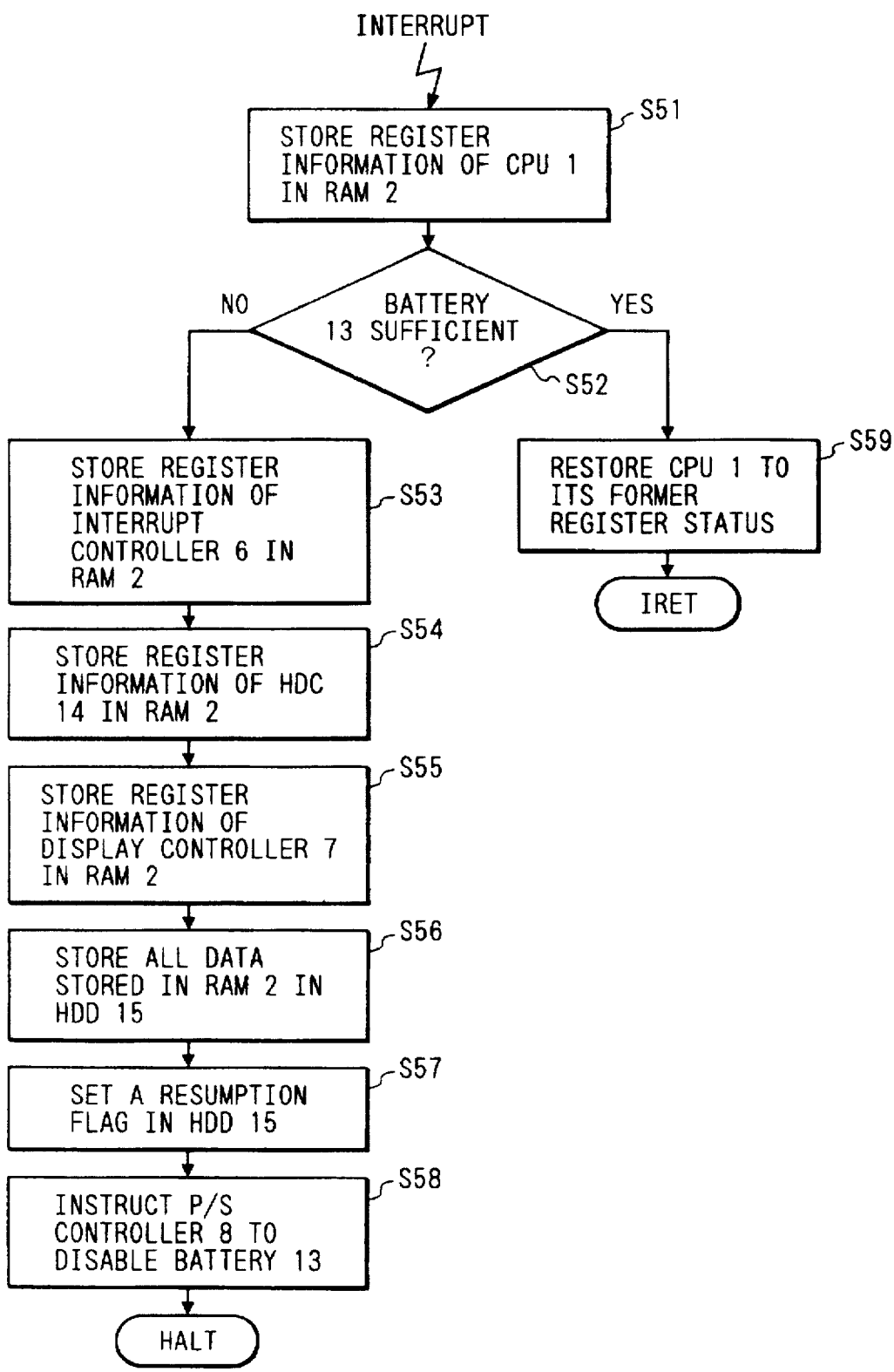
FIG. 11 is a flowchart for a program in the status storing mode to save resume information stored in an ROM in FIG. 10 onto an HDD.
Figure 12:
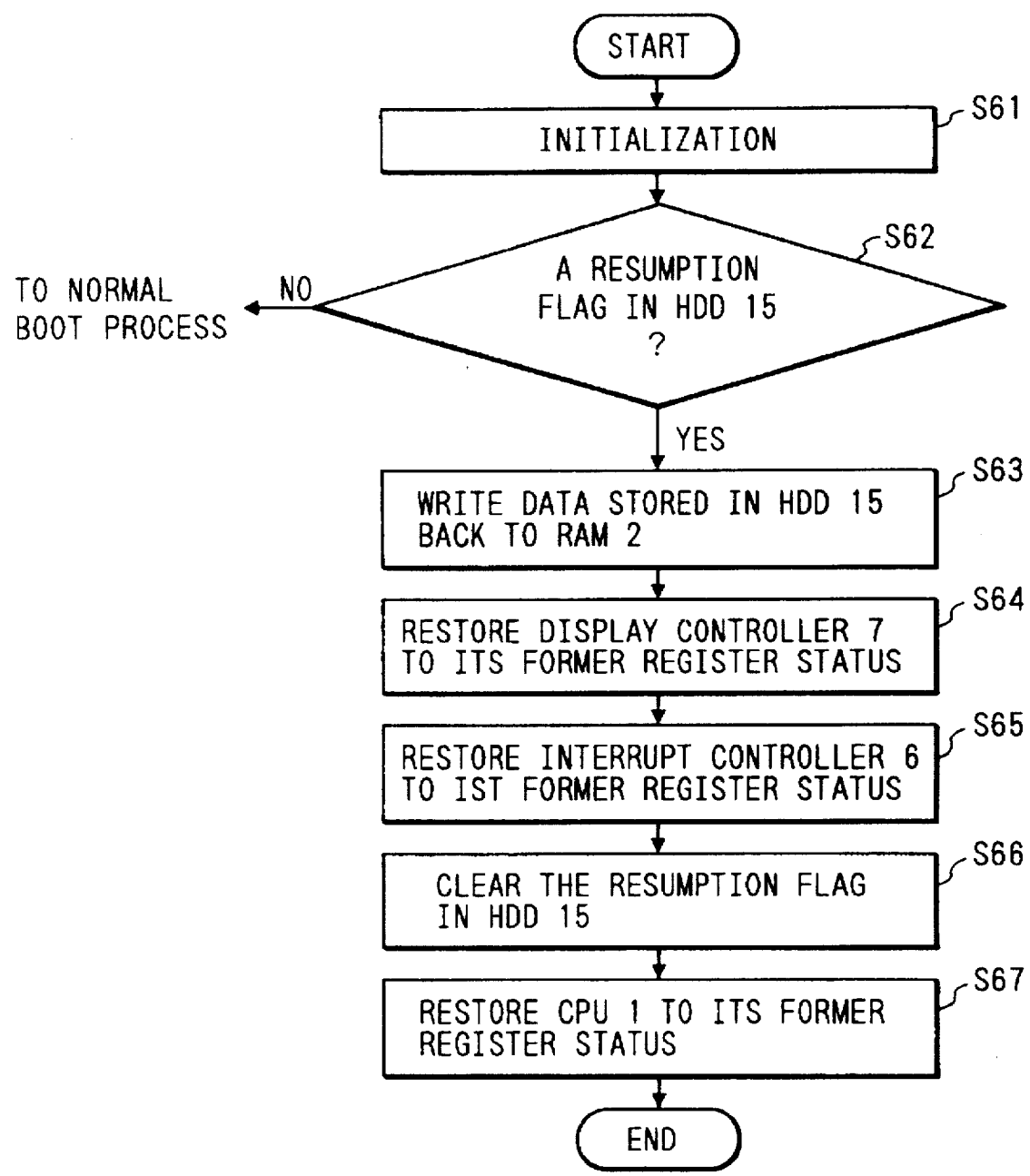
FIG. 12 is a flowchart for a program to realize the status resume in FIG. 10.

FIG. 11 is a flowchart for a program to save resume information stored in the ROM 3 to the HDD. FIG. 12 is a flowchart for a program to realize a status resume.

In the computer apparatus shown in FIG. 10, the CPU 1 receives an interruption from the timer 12 every predetermined time and starts the interruption program.

In step S51 in FIG. 11, the CPU 1 shown in FIG. 10 first executes a process to store the status of the internal register of the CPU itself into the RAM 2. As shown in FIG. 11 or 10, hereinafter, status of the battery 13 is checked in step S52. When the output voltage is sufficient, step S59 follows and the content of the internal register of the CPU 1 is returned to the former status and the processing routine is returned to the process just before the interruption. When the output voltage has dropped, the processing routine advances from step S52 to steps S53 to S55. The statuses with respect to the information of the interrupt controller 6 (in step S53), information of the HDC 14 (in step S54), and information of the display controller 7 (in step S55) are stored into the RAM 2, respectively. The content in the RAM 2 in which those information have been stored is directly stored into a dedicated area of the HDD 15 in step S56.

In the next step S57, a flag indicating that the resume information has been stored is set into the HDD 15. In the last step S58, the user instructs the P/S controller 8 to stop the power supply from the battery 13 and finishes the processing routine.

To resume the status, when the power supply of the computer apparatus is turned on in an ordinary manner, the computer main body is initialized in step S61 in FIG. 12. In step S62, a check is made to see if a flag indicating that the system is in the resume status has been set in the HDD 15 or not. When the flag is not set, the normal boot process is executed. On the other hand, when the flag has been set, all of the information stored in the HDD 15 are first written back into the RAM 2 in step S63. In the next step S64, the register of the display controller 7 is restored from the information in the RAM 2 in accordance with the data in the memory. The register of the interrupt controller 6 is also restored from the information in the RAM 2 in accordance with the data in the memory in step S65. The flag in the HDD 15 is cleared (erased) in step S66. In the last step S67, the internal register of the CPU 1 is restored and the processing routine is returned to the process upon execution of the resume.

According to the fourth embodiment as mentioned above, the means for monitoring the voltage of the built-in battery is provided and, when a residual capacity of the battery decreases, the internal register of each device and the information in the memory or the like are automatically written into another non-volatile recording medium (for example, disk device) and the resume state is set, so that the operating status can be also stored/resumed even when the power supply is shut off.

What is claimed is:

1. An electronic apparatus having a plurality of devices, said apparatus comprising:

instruction means for instructing said apparatus to shift to a power saving status;

determining means for determining, in response to an instruction given by said instruction means, whether at least one of the plurality of devices is operating and thus an intermission of a processing of the at least one device is impermissible; and control means for controlling said apparatus, in response to a determination by said determining means that at least one device is operating and thus the intermission of a processing of the at least one device is impermissible, to not shift to the power saving status and to return to an original status existing prior to the determination by said determining means that at least one device is operating and thus the intermission of a processing of the at least one device is impermissible, and for controlling said apparatus to shift to the power saving status and controlling a memory to store information indicating a status of each device in response to a determination by said determining means that none of the plurality of devices is operating and thus the intermission of a processing of each device is permissible.

2. An apparatus according to claim 1, wherein the at least one device comprises a floppy disk device.

3. An electronic apparatus having a plurality of devices, said apparatus comprising:

instruction means for instructing said apparatus to shift to a power saving status;

determining means for determining, in response to an instruction given by said instruction means, whether at least one of the plurality of devices is operating and thus an intermission of a processing of the at least one device is impermissible;

control means for controlling said apparatus to not shift to the power saving status in response to a determination by said determining means that at least one device is operating and thus the intermission of a processing of the at least one device is impermissible, and for controlling said apparatus to shift to the power saving status and controlling a memory to store information indicating a status of each device in response to a determination by said determining means that none of the plurality of devices is operating and thus the intermission of a processing of each device is permissible; and means, responsive to a determination by said determining means that at least one device is operating and thus the intermission of a processing of the at least one device is impermissible, for informing an operator to that effect.

4. An electronic apparatus having a plurality of devices, said apparatus comprising:

shift instruction means for instructing said apparatus to shift to a power saving status;

control means, responsive to an instruction given by said shift instruction means, for controlling a memory to store first information indicating a status of each device and controlling said apparatus to shift to the power saving status;

storage means for storing second information indicating that the memory has completely stored the first information; and return instruction means for instructing said apparatus to return from the power saving status, wherein said control means is also constructed and arranged for initializing said apparatus in response to an instruction given by said return instruction means, selecting at least one of the plurality of devices for which the first information has been completely stored in said storage means, and controlling the at least one selected device to return from the power saving status in response to the first information stored in the memory, said control means further controlling the plurality of devices other than the at least one selected device not to return from the power saving status in response to the stored first information.

5. An apparatus according to claim 4, wherein the at least one device comprises an interruption controller.

6. An apparatus according to claim 4, wherein the at least one device comprises a display controller.

7. A method for controlling an electronic apparatus having a plurality of devices, said method comprising the steps of:

instructing the apparatus to shift to a power saving status;

determining, in response to an instruction given in said instruction step, whether at least one of the plurality of devices is operating and thus an intermission of a processing of the at least one device is impermissible; and controlling the apparatus, in response to a determination by said determining step that at least one device is operating and thus the intermission of a processing of the at least one device is impermissible, to not shift to the power saving status and to return to an original status existing prior to the determination by said determining step that at least one device is operating and thus the intermission of a processing of the at least one device is impermissible, and controlling the apparatus to shift to the power saving status and controlling a memory to store information indicating a status of each device in response to a determination in said determining step that none of the plurality of devices is operating and thus the intermission of a processing of each device is permissible.

8. A method according to claim 7, wherein the at least one device comprises a floppy disk device.

9. A method for controlling an electronic apparatus having a plurality of devices, said method comprising the steps of:

instructing the apparatus to shift to a power saving status;

determining, in response to an instruction given in said instruction step, whether at least one of the plurality of devices is operating and thus an intermission of a processing of the at least one device is impermissible; and controlling the apparatus to not shift to the power saving status in response to a determination by said determining step that at least one device is operating and thus the intermission of a processing of the at least one device is impermissible, and controlling the apparatus to shift to the power saving status and controlling a memory to store information indicating a status of each device in response to a determination in said determining step that none of the plurality of devices is operating and thus the intermission of a processing of each device is permissible, and responsive to a determination in said determining step that at least one device is operating and thus the intermission of a processing of the at least one device is impermissible, informing an operator to that effect.

10. A method for controlling an apparatus having a plurality of devices, said method comprising the steps of:

instructing the apparatus to shift to a power saving status;

responsive to an instruction given in said instructing step, controlling a memory to store first information indicating a status of each device and controlling the apparatus to shift to the power saving status;

storing second information indicating that the memory has completely stored the first information;

instructing the apparatus to return from the power saving status; and initializing said apparatus in response to an instruction given by said second instruction means, selecting at least one of the plurality of devices for which the first information has been completely stored in said storage means, and controlling the at least one selected device to return from the power saving status in response to the first information stored in the memory, said second-mentioned controlling step further controlling the plurality of devices other than the at least one selected device to initialize themselves and to return from the power saving status in response to the stored first information.

11. A method according to claim 10, wherein the at least one device comprises an interruption controller.

12. A method according to claim 10, wherein the at least one device comprises a display controller.

* * * * *